United States Patent [19]

Ritchie

[11] Patent Number: 4,640,860
[45] Date of Patent: Feb. 3, 1987

[54] OPTICAL RECORDING COATING

[75] Inventor: Ian T. Ritchie, Santa Monica, Calif.

[73] Assignee: Andus Corp., Canoga Park, Calif.

[21] Appl. No.: 787,862

[22] Filed: Oct. 16, 1985

[51] Int. Cl.$^4$ .................. D06N 7/04; G01D 9/00
[52] U.S. Cl. .................. 428/143; 430/945; 346/135.1
[58] Field of Search .............. 430/945; 346/135.1; 428/143

[56] References Cited

U.S. PATENT DOCUMENTS

| | | |
|---|---|---|
| 3,415,681 | 12/1968 | Burgess . |
| 3,430,255 | 2/1969 | Everhart . |
| 3,542,545 | 11/1970 | Goffe . |
| 3,787,873 | 1/1974 | Sato et al. . |
| 3,982,936 | 9/1976 | Goffe . |
| 4,188,214 | 2/1980 | Kito et al. . |
| 4,269,917 | 5/1981 | Drexler et al. ............ 430/16 |
| 4,278,756 | 7/1981 | Bouldin et al. ............ 430/414 |
| 4,278,758 | 7/1981 | Drexler et al. ............ 430/616 |
| 4,298,684 | 11/1981 | Bouldin et al. ............ 430/616 |
| 4,371,954 | 2/1983 | Cornet . |
| 4,379,299 | 4/1983 | Fitzpatrick et al. . |
| 4,404,656 | 9/1983 | Cornet . |
| 4,405,994 | 9/1983 | Cornet et al. . |
| 4,425,570 | 1/1984 | Bell et al. . |
| 4,465,577 | 8/1984 | Tanielian . |
| 4,473,633 | 9/1984 | Wada et al. . |
| 4,548,889 | 10/1985 | Nemoto et al. . |
| 4,579,638 | 4/1986 | Scherber ............ 204/192 P |

FOREIGN PATENT DOCUMENTS

56-124134  3/1980  Japan .

OTHER PUBLICATIONS

Chao, "New Media Development at Burroughs: Material and Coating", Optical Data Storage, SPIE, vol. 382, pp. 149–156.

Jipson, "The Writing Mechanism for Discontinuous Metal Films", Optical Storage Media, SPIE, vol. 420, pp. 344–348.

Primary Examiner—John E. Kittle
Assistant Examiner—Patrick J. Ryan
Attorney, Agent, or Firm—Dennis E. Kovach; Herbert G. Burkard

[57] ABSTRACT

An optical data storage coating includes a cermet structure, the cermet including metal particles disposed in a dielectric matrix, both the metal particles and dielectric matrix being formed of stable, high melting point materials preferably depositable on a substrate by sputtering.

32 Claims, 1 Drawing Figure

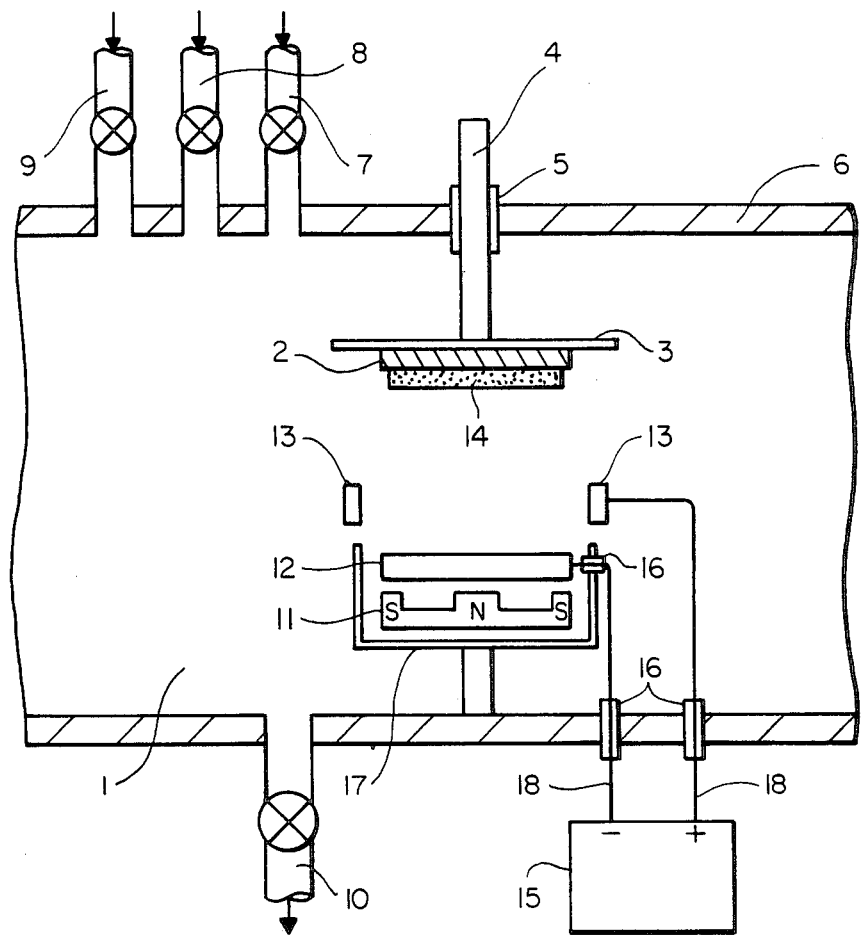
FIG_1

OPTICAL RECORDING COATING

BACKGROUND OF THE INVENTION

The present invention relates to the formation of a coating having a cermet structure and devices useable therewith, preferred uses being for optical data recording.

It is known that data can be recorded by selectively illuminating a material so as to selectively change a reflectance of specific portions of the material, such illumination being done using high powered lasers. To read the data, the material is later illuminated with a low powered laser, and differences in reflection from various bits of the material are detected as either a "1" or a "0".

Materials used for this purpose suffer several drawbacks since oftentimes relatively high power densities are required to adequately change a reflectance of a portion of the material so as to obtain a desired signal-to-noise ratio upon reading. In addition, such materials are oftentimes environmentally unstable, and therefore require the use of additional protective layers thereover. Furthermore, such materials have also proved difficult to make in a controlled fashion, and hence are relatively expensive.

An example of a prior art optical recording material or substrate is described by Chao "New Media Development at Burroughs: Material and Coating", Optical Data Storage, SPIE Vol. 382, pages 149–156. According to this reference, a tri-layer structure is formed which is composed of a reflective mirror layer over which is disposed a quarter wave length dielectric spacer layer over which is disposed a very thin metal absorber layer over which is disposed a thick overcoat protective layer. A preferred example for the metal absorber layer is gold. The gold is deposited in such a way so as to control its thin film microstructure such that the microstructure can be altered by laser heating to form an aggregated discontinuous structure whose reflectivity changes subsequent to being heated. Jipson, "The Writing Mechanism for Discontinuous Metal Films", Optical Storage Media, SPIE Vol. 420, pages 344-48, describes a mechanism by which a reflectivity of a metal absorber layer disposed on a PMMA substrate is changed by laser heating.

Substrates and coatings of the type described and analyzed by these two references are disadvantageous since optical, chemical, and mechanical properties of the metal coating layer are difficult to control during manufacture. Specifically, though the thickness of the metal layer can be varied to vary its absorption, reflection, and transmission, these variables cannot be independently controlled for any given metal to obtain optimum writing recording thresholds or optimum signal-to-noise ratios upon reading. In addition, since metals are excellent heat conductors, metal coatings are disadvantageous since relatively high writing powers are required to locally change the reflectance of the metal coating due to the metal's tendency to rapidly disperse heat over a wide area.

SUMMARY OF THE INVENTION

Accordingly, it is an object of the present invention to provide an optical recording coating and device therewith which does not have the above-noted drawbacks, which has a relatively low recording threshold, which can be made to be environmentally stable, and which can be tailored so as to have desired optical, mechanical, and chemical characteristics.

These and other objects are achieved by a coating comprising a cermet which includes a layer of metal particles dispersed in a solid dielectric matrix, the metal particles and dielectric matrix being co-deposited on a substrate made of a polymer, the coating being formulated such that upon being illuminated by high powered light a localized optical reflectance of the coating changes so as to be capable of recording data therein.

One preferred method of forming the optical coating of the invention is by sputtering, and preferably reactive sputtering, whereby a sputtering target comprises a metal to be deposited, with a sputtering chamber including the target having therein an ionizable inert gas, such as argon, and other gases capable of forming a dielectric matrix of the cermet during the sputtering process. By applying a high voltage differential between an anode and the target, which comprises a cathode, the target is co-deposited on the substrate with the dielectric matrix, with densities of the gases constituting the dielectric matrix being carefully controlled during the sputtering process so as to vary and optimize the properties of the coating so formed.

BRIEF DESCRIPTION OF THE DRAWING

FIG. 1 is a partial cross-sectional view of a sputtering apparatus for forming coatings in accordance with the invention.

DESCRIPTION OF THE PREFERRED EMBODIMENTS

According to the invention, a novel optical recording device includes a cermet structure layer 14 disposed on a surface of a polymer 2, with the layer 14 being constructed and dimensions such that its reflectance from a source to a detector, both relatively fixed in space, substantially and permanently changes subsequent to illuminating the layer 14 with high power light, such as can be supplied from a high powered laser, preferred embodiments including the use of a semiconducting laser. The change in reflectance can be used to denote either an on or an off state, e.g. a "1" or a "0", with little or no change in reflectance denoting the converse. Hence, to write information on such a device, successive portions of the layer are illuminated with a high powered laser appropriately modulated such that selective bits of the layer undergo a change in reflectance. To read the information, the device is later illuminated with a low powered laser, and reflection intensities from successive bits of the layer are detected, with a high reflectance denoting either the 1 or the 0, and a low reflectance indicating either the 0 or the 1.

The change in reflectance induced by the high powered laser results in the combined effect of damaging the layer 14 by the heat absorbed therein, and also by deforming and possibly even melting a portion of the polymer substrate 2 beneath the damaged layer 14 which causes an orientation of the deformed layer 14 to change and hence change a direction of its reflection. Since during reading an optical detector essentially remains fixed in space relative to an optical source (the low powered laser) and the layer 14, a change in the direction of the reflectance of the layer 14 is interpreted as a decrease in reflection. Since both effects described are useful in changing the reflectance of the layer 14, e.g. that of altering the layer 14 and of altering the substrate 2, it is preferable to dispose the layer 14 on a substrate having a relative low heat distortion point of approximately 130° C., possibly as high as 150° C., 200° C., or 220° C., since such relatively low heat distortion points of the substrate result in the substrate being locally altered or deformed when the layer 14 is illuminated with a high light power density. Accordingly, preferred substrates of the invention include polymers, rather than glasses, preferred embodiments comprising polycarbonate, acrylates, (e.g. PMMA), and polyester.

Coatings of the invention can be uniquely formed to provide a wide variety of desired optical, chemical, or mechanical properties by forming the coating on the substrate by reactive sputtering, one example of which will be described by reference to FIG. 1.

FIG. 1 illustrates a sputtering chamber 1 having a substrate 2 onto which the coating 14 is to be deposited, the coating 14 comprising a cermet which includes metal particles dispersed in a dielectric matrix. The metal particles originate from target 12, which comprises a cathode, and a voltage differential is maintained between an anode 13 and the target 12 to create a sputtering deposition process. A magnet 11 is utilized for confining ionized gases in a region of the target 12, the gases to be ionized being injected into the sputtering chamber 1 via any one of inlet ports 7-9. An outlet port 10 is provided for evacuating the sputtering chamber 1. The dielectric matrix is co-deposited onto the substrate 2 with the metal particles from the target 12 so as to form the composite coating 14 by supplying appropriate gases to form the dielectric matrix via any one of the inlet ports 7-9. The gases so supplied are ionized and polymerized by the electric fields created within the sputtering chamber 1 and hence are co-deposited with the metal particles from the target 12 onto the substrate 2. FIG. 1 further shows a substrate holder 3, 4, a seal 5 for sealing between the holder portion 4 and a wall 6 of the sputtering chamber 1, a D.C. high voltage power source 15, insulation 16, a shielding box 17 disposed around the cathode 12, and electrical connection cables 18.

By appropriately selecting the gases which are to constitute the dielectric matrix and by appropriately controlling their partial pressures within the sputtering chamber 1, any given layer composition 14 can be formed, and the formation thereof can be precisely controlled by measuring any one of a number of properties of the layer 14 as it is being deposited, such as its electrical resistance, and utilizing feedback control based upon such measurements.

According to a preferred embodiment, the target 12 comprises a single metal material, and other elements constituting the layer 14 are supplied in gaseous form. Such an embodiment has advantages in ease of fabrication of the target 12, and the proportion of the metal particles in the cermet can be precisely controlled since the partial pressures of the gases introduced into the chamber 1 can be appropriately controlled as well as the electric field intensities within the chamber 1. According to a preferred embodiment, oxygen constitutes one element which forms part of the dielectric matrix, and hence since it is not desired that the metal particles substantially react with the oxygen, the metal is chosen so as to have a free energy of oxide formation which is substantially lower than that of at least one of the gases in the chamber other than the oxygen. According to another embodiment, nitrogen is used rather than oxygen as part of the dielectric matrix.

Various metals can be chosen for the target 12, such metals including, but not being limited to, gold, nickel, copper, platinum, palladium, and rhodium. Also, various dielectric materials can be formed by appropriate choice of gases, examples of dielectric materials including oxygen being $SiO_2$, $SnO_2$, $In_2O_3$, $GeO_2$, $TiO_2$, $Ta_2O_5$, $ZnO$, $ZrO_2$, $Y_2O_3$, and $CdO$, and examples of dielectric materials including nitrogen being $Si_3N_4$, $TiN$, and other transition metal nitrides. For example, to form $SiO_2$, silane and oxygen can be introduced into the sputtering chamber, whereas to form $Si_3N_4$, silane and nitrogen (or a molecule containing nitrogen such as ammonia) can be introduced into the sputtering chamber. The choice of any given metal and any given dielectric, and gases used to form these dielectrics, can be determined experimentally depending on the desired optical, chemical, and mechanical properties of the resultant coating desired, and the invention includes all combinations of the dielectrics and metals set forth above, and the use of all gases to form such dielectrics.

In addition, though a preferred embodiment is to utilize only a single metal since fabrication of the target 12 is thus simplified, it is conceivable that the coating could comprise more than one type of metal disposed in a dielectric matrix, and hence the target 12 could be formulated from or could comprise a mixture of various ones of the metals set forth above, the invention including all such modifications. Alternatively, the additional metals could be introduced into the chamber 1 in gaseous form.

By choosing the correct metal/dielectric ratio, it is possible to produce a coating that has low thermoconductivity and which also has both a high absorption and a high reflectance at various wave lengths commonly used for lasers, especially semiconducting lasers. In particular, it is possible to formulate coatings having a reflectance between 20% and 50% and an absorption likewise between 20% and 50%, preferred values of the reflectance and absorption being between 40% and 50%, and coatings having absorptions and reflectances between 35% and 45% are easily formulated, typical wave lengths for such values being approximately 830 nanometers, which is one preferred wave length for current semiconducting lasers. However, it should be understood that preferred reflectances and absorptions can be obtained at other wave lengths as well by appropriately choosing the metal and dielectric materials and by appropriately controlling the metal/dielectric ratio. The thermoconductivity can be kept low so as to be of an order of magnitude of the ceramic, rather than of an order of magnitude of the metal constituting the particles, preferred embodiments being thermoconductivities of between one and three times that of the dielectric matrix alone.

Since a preferred technique for formulating the coating is by sputtering, the thickness of the coating can be precisely controlled and can be maintained extremely thin. Typical thicknesses of coatings useful with the invention are between 500 and 2000 angstroms, though coatings outside this range could likewise be employed if so desired. Increasing the coating thickness increases the absorption of the coating and decreases its transmittance. However, it should be understood that though prior art metalic coatings are constrained in that the absorption/transmittance values cannot be independently changed by simply changing the coating thickness, the coatings of the present invention can be formulated such that the transmittance and absorption can be independently changed since the metal/dielectric ratio can be varied in addition to the coating thickness, and the thermoconductivity can be independently varied as well.

Furthermore, by depositing a reflective layer onto the substrate 2 prior to depositing the optical coating 14 thereon, a path length of light propagating through the coating 14 can be doubled, and hence the absorption of the layer 14 can likewise be doubled for any given thickness. Accordingly, the use of a reflective layer can be utilized to decrease the thickness of the coating 14 if desired. In addition, if the metal/dielectric materials are chosen so as not to be optimally environmentally stable, a further protective layer can be deposited over the coating 14 to increase environmental stability. It should be understood this is not necessary if the metal/dielectric materials are appropriately chosen.

The invention further includes a novel method of formulating an optical coating, this method constituting the steps of sputtering a target having a single material therein while introducing various other materials comprising the coating into the sputtering chamber in a gaseous form. As previously indicated, by varying the partial pressures of the various gases within the sputtering chamber, the composition of the coating can be varied as desired, and the various coatings so formed can then be evaluated to determine their optical, chemical, and mechanical properties. Hence, through experimentation, one can formulate an "optimum" coating having optimum properties for the end use desired. Once the optimum composition of the coating is determined, one can then make the coating by using a target having one or more of the elements comprising the coating in mixture form thus alleviating the necessity of introducing as many component elements in gaseous form as is done when first developing the coating. Using a more complicated composite target is advantageous since some elements are inconvenient to work with in gaseous form due to toxicity problems, etc. Hence, when such problems exist, the disadvantages of formulating a more complicated composite target are relatively minor. With the invention, coatings exhibiting an adequate change of reflectance are possible with energy levels as low as 0.4 nJ/um$^2$, as low as 0.3 nJ/um$^2$, and even as low as 0.2 nJ/um$^2$.

Coatings and devices useable therewith have numerous applications according to the invention. Continuous substrate films can be coated according to the invention, and such films can then be cut into any appropriate shapes, such as those appropriate for recording disks or credit cards, or can be left in sheet or tape form if desired, the invention including all such ultimate embodiments. Also, discs and other various preshaped substrates can directly be coated.

EXAMPLE 1

An eighteen inch diameter stainless steel bell jar type vacuum chamber was fitted with a four inch diameter planar magnetron sputtering source, a substrate holder suitable for supporting three inch square substrates three inches from the source, and a shutter interspersed between the sputtering source and the substrate. The chamber was evacuated to a pressure of $1.8 \times 10^{-5}$ Torr, then backfilled with high purity argon gas to a pressure of $6.0 \times 10^{-3}$ Torr.

A gold target 99.9% pure, attached to the sputtering source, was sputter cleaned by applying DC power of 150 watts for approximately three minutes. The shutter remained closed during this operation so that no coating was deposited on the substrate.

The chamber was then reevacuated briefly, then backfilled to a partial pressure of $8.0 \times 10^{-4}$ Torr of high purity oxygen, $3.7 \times 10^{-3}$ Torr of high purity argon, and $6.6 \times 10^{-4}$ Torr of high purity silane gas. DC power of 154 watts at 429 volts and 0.319 amps was applied to the magnetron sputtering source, and the shutter was opened for a period of twenty seconds allowing a coating to be deposited onto a substrate of PET polyester film, three inches square, which had been fitted to the substrate holder.

The resulting coating had a reflectance of 0.40 for 820 nm wave length light and an absorptance of 0.41 for that wave length of light.

EXAMPLE 2

The same apparatus as described in Example 1 was used to produce another coating. The same target sputter cleaning procedure as described in Example 1 was also used.

The deposition conditions for this second coating were a partial oxygen pressure of $8.0 \times 10^{-4}$ Torr, a partial argon pressure of $3.7 \times 10^{-3}$ Torr and a partial silane pressure of $6.6 \times 10^{-4}$ Torr. DC power applied to the target was 150 watts, at 468V, 0.285A. A coating was deposited onto a PET polyester substrate for 20 seconds, and this coating had a reflectance for 820 nm wave length light of 46% and an absorptance at that wave length of 36%.

EXAMPLE 3

The same apparatus, cleaning procedure and deposition conditions described in Example 2 were used to make a third coating on a PET polyester film substrate, but the deposition time was increased to 30 seconds. This coating had an 820 nm reflectance of 37% and an absorptance of 56%.

The reflectances and absorptances of all three coatings described above changed by less than 5% when they were exposed to an ambient laboratory environment, 80° C. dry heat, and 60° C.-95% relative humidity heat, for over one hundred hours, indicting good environmental stability.

Though the invention has been described with reference to certain preferred embodiments thereof, it should be understood the invention is not to be limited thereby. In particular, though, coatings and devices useable therewith are described as being formulated by sputtering, in particular reactive sputtering, other deposition processes could be used as well. Accordingly, the invention should be limited only by the appended claims and reasonable equivalents thereof.

What is claimed is:

1. An optical recording coating for recording data, comprising:
    a cermet optical storage layer disposed on a substrate, the layer comprising metal particles dispersed in a solid dielectric matrix, the metal particles comprising a first material selected from the group consisting of gold, silver, nickel, copper, platinum, palladium, rhodium and combinations thereof, the dielectric comprising a second material selected from the group consisting of $SiO_2$, $SnO_2$, $In_2O_3$, $GeO_2$, $TiO_2$, $Ta_2O_5$, ZnO, $ZrO_2$, $Y_2O_3$, CdO, $Si_3N_4$, TiN and other transition metal nitrides and combinations thereof, the layer being constructed and dimensioned such that its reflectance towards a fixed point substantially changes subsequent to being illuminated by high powered light such that information can be stored in the layer by selectively illuminating the layer with the high powered light, the layer being selectively illuminated with the high powered light.

2. The coating as claimed in claim 1, the metal particles and dielectric matrix being simultaneously co-deposited onto the substrate.

3. The coating as claimed in claim 2, the layer being constructed and dimensioned such that its reflectance towards the fixed point in space is permanently changed subsequent to being illuminated by the high powered light.

4. The coating as claimed in claim 2, the metal particles and dielectric matrix being co-deposited by sputtering a metal target in an atmosphere of gases some of which form the dielectric matrix.

5. The coating as claimed in claim 1, the reflectance being determined by illuminating the layer with low powered light at an angle of incidence less than 30° and detecting reflected light at an angle of incidence less than 30°.

6. The coating as claimed in claim 4, the layer having a thickness between 500 and 2000 angstroms.

7. The coating as claimed in claim 2, further comprising a substrate onto which the cermet optical storage layer is disposed, the substrate being a polymer having a heat distortion point below about 220° C.

8. The coating as claimed in claim 7, the heat distortion point being below 200° C.

9. The coating as claimed in claim 8, the heat distortion point being below 150° C.

10. The coating as claimed in claim 7, the substrate being a material selected from the group consisting essentially of polyester, polycarbonate, and acrylates.

11. The coating as claimed in claim 1, the layer consisting essentially of gold particles dispersed in an $SiO_2$ matrix.

12. The coating as claimed in claim 11, a gold volume fraction of the layer being between 20% and 50% by atomic percentage.

13. The coating as claimed in claim 12, the gold volume fraction being between 30% and 40%.

14. The coating as claimed in claim 1, the reflectance and the absorptance of the layer prior to being illuminated with the high powered light each being greater than 30%.

15. The coating as claimed in claim 1, the reflectance and the absorptance of the layer prior to being illuminated with the high powered light each being greater than 40%.

16. The coating as claimed in claim 1, the high powered light being semiconductor laser light.

17. An optical recording device for recording data, comprising:
a polymeric substrate; and
a cermet optical storage layer disposed on the substrate, the layer including metal particles dispersed in a solid dielectric matrix, the metal particles consisting essentially of a first material selected from the group consisting of gold, silver, nickel, copper, platinum, palladium, rhodium and combinations thereof, the dielectric consisting essentially of a second material selected from the group consisting of $SiO_2$, $SnO_2$, $In_2O_3$, $GeO_2$, $TiO_2$, $Ta_2O_5$, $ZnO$, $ZrO_2$, $Y_2O_3$, $CdO$, $Si_3N_4$, $TiN$ and other transition metal nitrides and combinations thereof, the layer being constructed and dimensioned such that its reflectance towards a fixed point is substantially reduced subsequent to being illuminated by high powered laser light, the layer being so illuminated.

18. The device of claim 17, the reflectance of a bit of the layer not illuminated with the high powered laser light being greater than 0.2.

19. The device of claim 18, the non-high powered illuminated bit reflectance being greater than 0.3.

20. The device of claim 19, the non-high powered illuminated bit reflectance being greater than 0.4.

21. A method of forming an optical recording coating, comprising the steps of:
disposing a target comprising a first material in a sputtering chamber;
disposing a substrate to be coated within the chamber, the substrate comprising a polymer;
injecting an inert gas into the chamber;
injecting at least one further gas into the chamber;
creating an electric potential between the target and an anode of sufficient strength to ionize the inert gas;
the first material and the at least one further gas being selected so as to form a cermet optical storage layer on the substrate when the electric potential is created, the layer comprising metal particles disposed in a solid dielectric matrix, the metal particles comprising a second material selected from the group consisting of gold, silver, nickel, copper, platinum, palladium, rhodium and combinations thereof, the dielectric comprising a third material selected from the group consisting of $SiO_2$, $SnO_2$, $In_2O_3$, $GeO_2$, $TiO_2$, $Ta_2O_5$, $ZnO$, $ZrO_2$, $Y_2O_3$, $CdO$, $Si_3N_4$, $TiN$ and other transition metal nitrides and combinations thereof.

22. A method of optically recording data, comprising the steps of:
selectively exposing a substrate to laser light, the substrate including a coating layer, the coating layer comprising metal particles dispersed in a ceramic matrix, the metal particles comprising a first material selected from the group consisting of gold, silver, nickel, copper, platinum, palladium, rhodium and combinations thereof, the ceramic matrix comprising a second material selected from the group consisting of $SiO_2$, $SnO_2$, $In_2O_3$, $GeO_2$, $TiO_2$, $Ta_2O_5$, $ZnO$, $ZrO_2$, $Y_2O_3$, $CdO$, $Si_3N_4$, $TiN$ and other transition metal nitrides and combinations thereof.

23. A method of reading optically recorded data, comprising the steps of:
exposing a substrate to low power laser light, the substrate including a coating layer thereon, the coating layer comprising metal particles dispersed in a ceramic matrix, the metal particles comprising a first material selected from the group consisting of gold, silver, nickel, copper, platinum, palladium, rhodium and combinations thereof, the ceramic matrix comprising a second material selected from the group consisting of $SiO_2$, $SnO_2$, $In_2O_3$, $GeO_2$, $TiO_2$, $Ta_2O_5$, $ZnO$, $ZrO_2$, $Y_2O_3$, $CdO$, $Si_3N_4$, $TiN$ and other transition metal nitrides and combinations thereof, the substrate previously selectively being exposed to high power laser light such that bits thereof so exposed to the high power laser light have a reflectance to the low power light substantially less than bits thereof not so exposed.

24. A method of optimizing properties of an optical storage layer for storing information by being selectively illuminated with high powered light, comprising the steps of:

varying a thickness of the optical storage layer and varying a metal particle atomic fraction as well as a solid dielectric atomic fraction of the optical storage layer so as to optimize an optical reflectance, an optical absorptance, and a thermoconductivity of the optical storage layer so as to be suitable for recording information by being selectively illuminated with high power light, the optical storage layer comprising a cermet optical storage layer, the cermet comprising metal particles dispersed in a ceramic matrix, the metal particles comprising a first material selected from the group consisting of gold, silver, nickel, copper, platinum, palladium, rhodium and combinations thereof, the ceramic matrix comprising a second material selected from the group consisting of $SiO_2$, $SnO_2$, $In_2O_3$, $GeO_2$, $TiO_2$, $Ta_2O_5$, $ZnO$, $ZrO_2$, $Y_2O_3$, $CdO$, $Si_3N_4$, $TiN$ and other transition metal nitrides and combinations thereof.

25. The coating as claimed in claim 1, the layer consisting essentially of the first material and the second material.

26. The method of claim 21, the layer consisting essentially of the second material and the third material.

27. The method of claim 22, the layer consisting essentially of the first material and the second material.

28. The method of claim 23, the layer consisting essentially of the first material and the second material.

29. The method of claim 24, the layer consisting essentially of the first material and the second material.

30. The method of claim 24, the dielectric atomic fraction being varied by varying a partial pressure of at least one additional gas used to form at least part of the ceramic matrix within a sputtering chamber.

31. The method of claim 24, the dielectric atomic fraction being varied by varying a composition of a target used for forming at least part of the layer within a sputtering chamber.

32. The method of claim 24, optical properties of the layer being varied by varying a sputtering power.

* * * * *